(12) United States Patent
Arnold

(10) Patent No.: US 10,601,193 B2
(45) Date of Patent: Mar. 24, 2020

(54) DEVICE FOR CONNECTING TWO CONDUCTIVE ELEMENTS OF A SUPPLY RAIL

(71) Applicant: FELS, Illkirch-Graffenstaden (FR)

(72) Inventor: Claude Arnold, Strasbourg (FR)

(73) Assignee: FELS, Illkirch-Graffensta (FR)

( * ) Notice: Subject to any disclaimer, the term of this patent is extended or adjusted under 35 U.S.C. 154(b) by 0 days.

(21) Appl. No.: 16/118,577

(22) Filed: Aug. 31, 2018

(65) Prior Publication Data

US 2019/0074648 A1    Mar. 7, 2019

(30) Foreign Application Priority Data

Sep. 1, 2017    (FR) ........................................ 17 58106

(51) Int. Cl.

| | |
|---|---|
| H01R 4/58 | (2006.01) |
| H01R 25/16 | (2006.01) |
| H01R 25/14 | (2006.01) |
| H01R 41/00 | (2006.01) |
| B60M 1/30 | (2006.01) |
| H01R 4/48 | (2006.01) |

(52) U.S. Cl.
CPC ........... *H01R 25/162* (2013.01); *B60M 1/305* (2013.01); *H01R 4/48* (2013.01); *H01R 4/58* (2013.01); *H01R 25/145* (2013.01); *H01R 41/00* (2013.01); *H01R 4/4809* (2013.01)

(58) Field of Classification Search
CPC .... H01R 25/162; H01R 41/00; H01R 25/145; H01R 4/48; H01R 4/58; H01R 4/4809; B60M 1/305
See application file for complete search history.

(56) References Cited

U.S. PATENT DOCUMENTS

| | | | | |
|---|---|---|---|---|
| 3,614,297 | A * | 10/1971 | Carlson ..................... | H02G 5/06 174/117 FF |
| 3,801,751 | A | 4/1974 | Ross, Jr. | |
| 4,509,010 | A * | 4/1985 | Cedrone ................... | H01R 4/48 324/537 |
| 4,552,425 | A * | 11/1985 | Billman ................. | H01R 13/28 439/295 |
| 4,845,589 | A * | 7/1989 | Weidler ................ | H01R 25/162 361/614 |
| 5,158,472 | A * | 10/1992 | Juhlin .................. | H01R 25/162 439/215 |

(Continued)

FOREIGN PATENT DOCUMENTS

DE    2238958 A1    2/1974

OTHER PUBLICATIONS

Preliminary Search Report issued in corresponding application No. FR 1758106 dated Apr. 18, 2018.

*Primary Examiner* — Truc T Nguyen

(74) *Attorney, Agent, or Firm* — Carter, DeLuca & Farrell LLP

(57) ABSTRACT

A device for connecting two conductive elements of a conductor rail is provided including a sliding contact surface, two connection tabs formed by one end of each of the two conductive elements, these connection tabs being arranged to be placed in respective parallel planes and offset with respect to the sliding contact surface of the rail, and a junction piece of the two connecting tabs having at least one contact surface placed level with the sliding contact surface of the conductors.

10 Claims, 2 Drawing Sheets

(56) References Cited

U.S. PATENT DOCUMENTS

| | | | | |
|---|---|---|---|---|
| 5,236,370 | A * | 8/1993 | King | H02G 3/288 |
| | | | | 439/171 |
| 9,184,525 | B1 * | 11/2015 | Ranta | H01R 13/20 |
| 9,722,372 | B2 * | 8/2017 | Byrne | H01R 25/162 |
| 2003/0124914 | A1 * | 7/2003 | Mills | H01R 4/48 |
| | | | | 439/723 |
| 2006/0223385 | A1 * | 10/2006 | Pavlovic | H01R 13/113 |
| | | | | 439/858 |
| 2012/0156909 | A1 * | 6/2012 | Tyler | H01R 13/112 |
| | | | | 439/259 |
| 2013/0126204 | A1 * | 5/2013 | Nohara | H01H 85/044 |
| | | | | 174/50 |
| 2014/0179132 | A1 * | 6/2014 | Byrne | H01R 25/162 |
| | | | | 439/92 |
| 2015/0357773 | A1 * | 12/2015 | Schirmeier | H01R 25/162 |
| | | | | 439/121 |
| 2016/0052468 | A1 * | 2/2016 | Kanagawa | H02G 3/0462 |
| | | | | 174/68.3 |
| 2016/0071630 | A1 * | 3/2016 | Sugino | H02G 15/1806 |
| | | | | 174/68.3 |
| 2017/0063301 | A1 * | 3/2017 | Ash | H02S 20/00 |
| 2018/0076586 | A1 * | 3/2018 | Rangi | H01R 11/12 |

\* cited by examiner

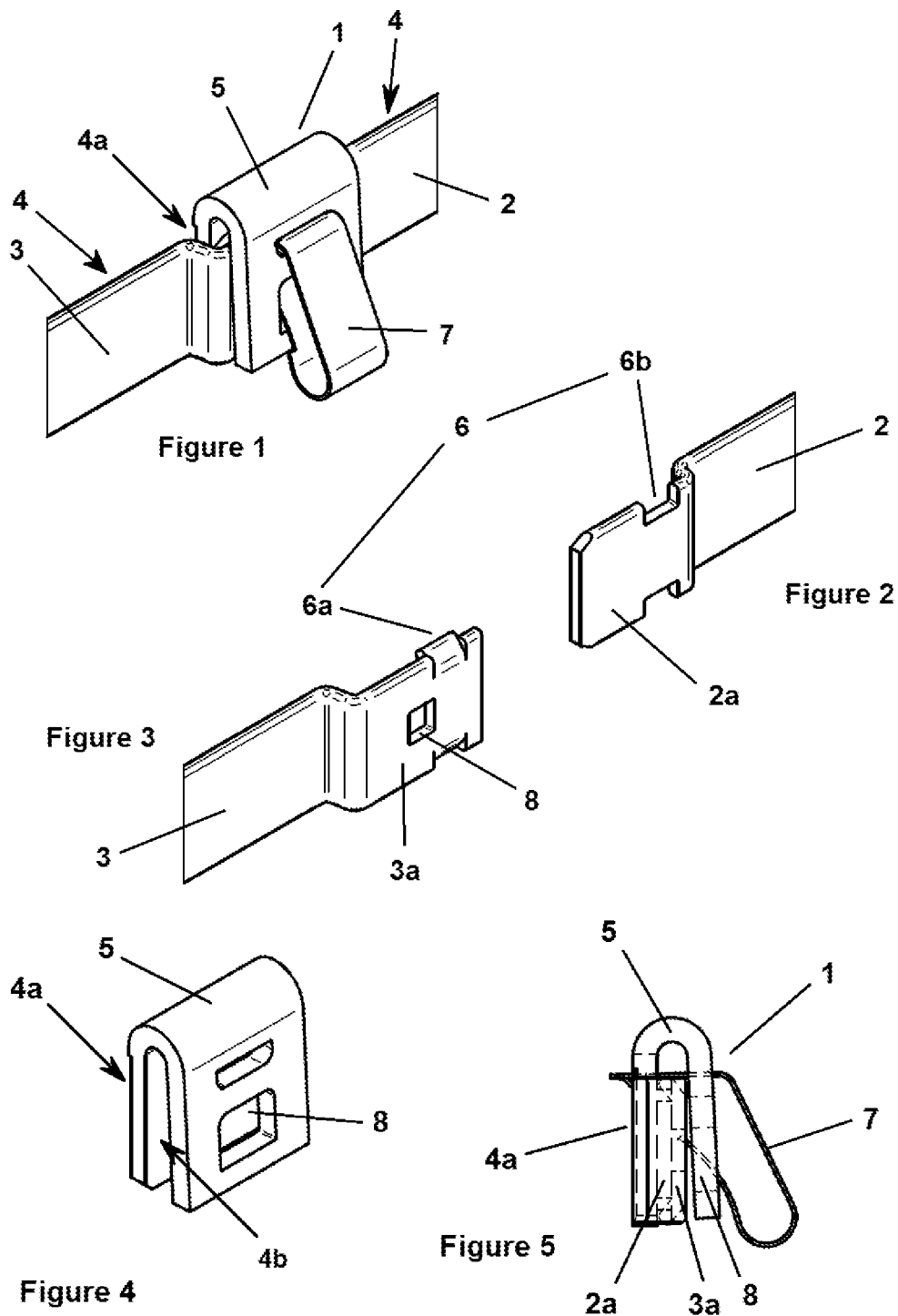

DEVICE FOR CONNECTING TWO CONDUCTIVE ELEMENTS OF A SUPPLY RAIL

TECHNICAL FIELD

This invention relates to the field of sliding contact conductor rails and more particularly to the field of connection systems of two conductive rail elements.

BACKGROUND

The construction of a network of sliding contact conductor rails can lead to complex architectures that sometimes require a certain modularity to facilitate their installation and maintenance. Fixing two successive rail portions must, firstly, ensure a good electrical connection but also, secondly, maintain mechanical continuity at the sliding contact surface.

Currently, some assembly solutions involve screw fastening mechanisms placed on one or more different surfaces of the sliding contact surface. These fastening mechanisms may involve pins, possibly combined with a screw clamping mechanism or even crimping.

However, these assembly solutions may not only have the disadvantage of preventing any reversibility of the fastener but also may require the use of at least one tool to set up the mechanism for holding the assembly of the rail portions therebetween. Also, the separation of rail portions, for example in the context of disassembly, replacement or repair, is made more complex, even impossible without breaking them, with these holding mechanisms.

Moreover, the ends of these rail segments also have the disadvantage that one may be exposed to shocks during their transport or handling. The deformation of one of these ends then no longer allows the rail segment to have optimal sliding contact surfaces or to correctly perform an effective electrical connection.

This invention aims to overcome these disadvantages by proposing a reversible rail portion assembly device that does not require the use of a mounting tool while maintaining a sliding contact surface that offers free access.

SUMMARY

Thus, the invention relates to a device for connecting two conductive elements of a conductor rail comprising a sliding contact surface, characterized in that the device comprises: two connection tabs formed by one end of each of the two conductive elements, these connection tabs being arranged to be placed in respective parallel planes and offset with respect to the sliding contact surface of the rail, a junction piece of the two connection tabs comprising at least one contact surface placed level with the sliding contact surface of the conductors, and in that the junction piece comprises a jumper structure with its legs positioned on either side of the connection tabs in contact so as to grip the connection tabs of the conductive elements, while making an electrical connection between at least the connection tab of a conductive element and the contact surface of the junction piece placed level with the sliding contact surface of the conductors.

BRIEF DESCRIPTION OF THE DRAWINGS

The invention will be better understood, by means of the description below, relative to a preferred embodiment, given as a non-restrictive example, and explained with reference to the attached schematic drawings, in which:

FIG. 1 relates to a schematic representation of a first embodiment of an assembled connection device according to the invention in a perspective view.

FIGS. 2 and 3 relate to the respective schematic representations of the disassembled connection tabs of a connection device according to the first embodiment.

FIG. 4 relates to a schematic representation of a disassembled junction piece with no means of pressurizing, of a connection device according to the first embodiment.

FIG. 5 relates to a schematic representation of a first embodiment of an assembled connection device according to the invention in a sectional view in a plane perpendicular to the plane of the sliding contact.

DETAILED DESCRIPTION

Figure 6:
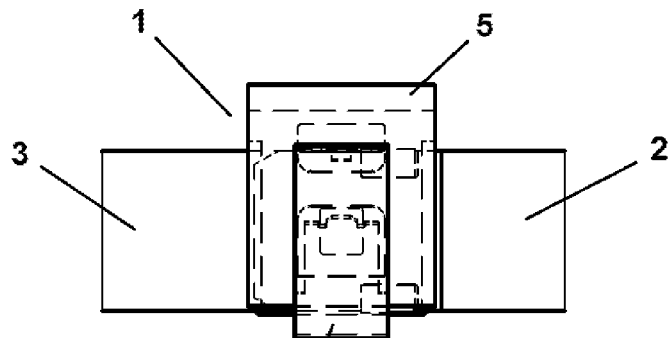
FIG. 6 relates to a schematic representation of a first embodiment of an assembled connection device according to the invention in a perspective view.
Figure 7:
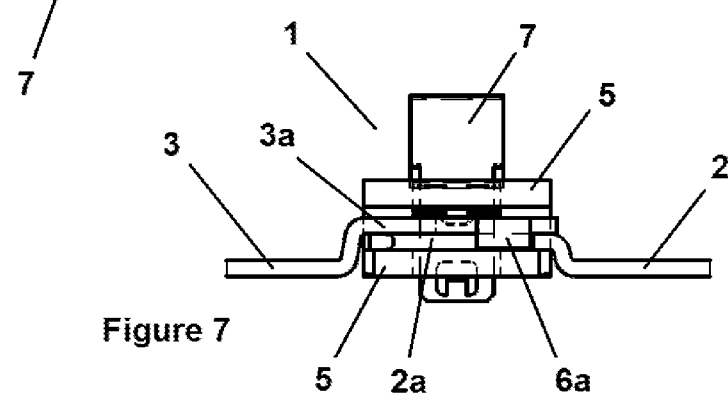
FIG. 7 relates to a schematic representation of a first embodiment of an assembled connection device according to the invention in a lower view.

This invention is based on a device 1 for connecting two conductive elements 2, 3 of a conductor rail comprising a sliding contact surface 4, characterized in that the device 1 comprises:

two connection tabs 2a, 3a formed by one end of each of the two conductive elements 2, 3, these connection tabs 2a, 3a being arranged to be placed in respective parallel planes and offset with respect to the sliding contact surface 4 of the rail, a junction piece 5 of the two connection tabs 2a, 3a comprising at least one contact surface 4a placed level with the sliding contact surface 4 of the conductors 2, 3 and in that the junction piece 5 comprises a jumper structure with its legs positioned on either side of the connection tabs 2a, 3a in contact so as to grip the connection tabs 2a, 3a of the conductive elements, while making an electrical connection between at least the connection tab 2a, 3a of a conductive element 2, 3 and the contact surface 4a of the junction piece 5 placed level with the sliding contact surface 4 of the conductors.

The connecting device 1 of the invention thus allows implementation of a connection through a junction piece 5 while having a surface 4a positioned level with the sliding contact surface 4 of the conductors 2, 3, participates in the formation of at least one portion of the sliding contact 4 of the conductor rail.

The jumper structure of the junction piece 5 allows implementation of a structure capable of joining the connection tabs 2a, 3a so that they remain in contact. According to a specific construction, the junction piece 5 is in pressure against one of the connection tabs through the inner surface 4b positioned at the leg which carries the contact surface 4a of the connecting piece 5 placed level with the sliding contact surface 4 of the conductors. This contact of the connection tabs 2a, 3a thus allows for an electrical connection and therefore electrical continuity along the conductor rail of one conductive element 2 to another 3. Furthermore, the jumper structure of the junction piece 5 allows implementation of a cage which surrounds at least in part the contact of the two connection tabs 2a, 3a. This construction thus makes it possible to protect the contact between the connection tabs 2a, 3a during the passage of a brush along the sliding contact of the conductor rail. Furthermore, the positioning of one surface 4a of the junction piece 5 level with the sliding contact surface 4 of the conductors 2, 3 makes it possible to combine the protection of the contact of the connection tabs 2a, 3a with one sliding contact surface 4 which is not disturbed by the junction piece 5.

According to a construction feature, the connection device 1 is characterized in that:
the offset of a first connection tab 2a with respect to the sliding contact surface 4 of the conductors 2, 3 forms a gap similar to the thickness of the portion of the junction piece 5 which carries the contact surface 4a, the offset of the second connection tab 3a with respect to the sliding contact surface 4 of the conductors 2, 3 forms a gap similar to the cumulative thicknesses of the portion of the junction piece 5 carrying the contact surface 4a and the first connection tab 2a.

This construction of the connecting device 1 thus makes it possible to obtain a conductor rail with a junction between two rail portions 2, 3 which maintains a constant sliding contact surface 4 while limiting the thickness of the connection between the three pieces that are the conductors 2, 3 and the junction piece 5. The connection thus allows sandwiching of a first of the connection tabs between, firstly, a portion of the junction piece 5 and, secondly, the second of the connection tabs. This sandwich positioning also contributes to establishing an electrical continuity between these three parts 2, 3 and 5.

According to a construction feature that is not a limiting factor to the invention, and which helps to make it easy to position the connection tabs 2a, 3a between the legs of the junction piece 5, the connection tabs 2a, 3a have substantially flat shape structures. This flattened construction of connection tabs 2a, 3a allows them to contact each other through a juxtaposition in the plane of the thickness of the conductor rail by establishing a contact position through the substantially flat surfaces of the connection tabs 2a, 3a. Such a juxtaposition of the connection tabs 2a, 3a which are flattened and offset with respect to the sliding contact surface 4 of the conductors 2, 3, thus allows the connection tabs 2a, 3a to come into contact without this connection producing an extra thickness on the conductor rail at a point of the conductor rail path and in particular at the sliding contact surface 4.

In accordance with to a construction example of the invention, in a similar fashion, at least one of the jumper's legs that forms part of the junction piece 5 is flattened with, firstly, a surface which forms the contact surface 4a placed level with the sliding contact surface 4 of the conductors and, secondly, a complementary surface with the surface of the first connection tab 2a against which the leg of the junction piece 5 is supported. The leg of the junction piece 5 is thus in contact juxtaposed to the first connection tab 2a in the direction of the thickness of the conductor rail.

According to another construction feature, the connection device 1 is characterized in that the connection tabs 2a, 3a of the conductive elements 2, 3 comprise shapes that are complementary to each another. This shape complementarity makes it possible to optimize the contact of the connection tabs 2a, 3a with each other so that the intimacy of the connection is improved by involving, for example, a maximized contact area between the two connection tabs 2a, 3a. According to a specificity of this construction feature, the complementary shape of the conductive elements 2, 3 may be extended to the junction piece 5. Moreover, the complementary shape can be achieved in a plane perpendicular to the plane of the sliding contact surface 4 or to the axis of the conductor rail.

According to another construction feature, the connection device 1 is characterized in that the tabs 2a, 3a of the conductive elements 2, 3 comprise at least one locking interface 6 of the translation between the connection tabs 2a, 3a of the conductive elements 2, 3 made by a combination of reliefs and/or forms performing a type of male 6a/female 6b interaction. This combination of reliefs, in addition to achieving shape complementarity optimizing the assembly of the tabs 2a, 3a of the conductive elements 2, 3, also improves the stability of the connection. Indeed, complementarity of the three-dimensional shapes between the connection tabs 2a, 3a, in particular in a plane perpendicular to the plane of the sliding contact surface 4 or the axis of the conductor rail, allows implementation of a mechanism to lock 6 the translation of the connection tabs 2a, 3a therebetween. Such complementarity of the three-dimensional shape thus makes it possible to lock the translation of the connection tabs 2a, 3a together when these connection tabs 2a, 3a are maintained in contact with each other.

According to a construction example which is does not limit the embodiment of the invention, a first of the connection tabs comprises a deformation 6a in the form of a relief with respect to the plane of the connection tab and the second of the connection tabs comprises a hollow or an orifice 6b within its thickness which is adapted to receive the relief of the first connection tab. Placing the respective dedicated surfaces of the connection tabs 2a, 3a in contact is performed in conjunction with the insertion of the relief 6a of the first connection tab into the hollow 6b of the thickness of the second connection tab. The pinch hold of the two connection tabs 2a, 3a under pressure makes it possible to maintain the insertion of the relief 6a of the first connection tab into the hollow 6b of the thickness of the second connection tab and limits or even blocks the translation of the two connection tabs 2a, 3a together.

In a complementary manner, a similar construction can be made between a leg of the junction piece 5 and the connection tab 2a bearing against this leg to prevent the translation of the connection tab 2a with respect to the junction piece 5.

Figure 8:
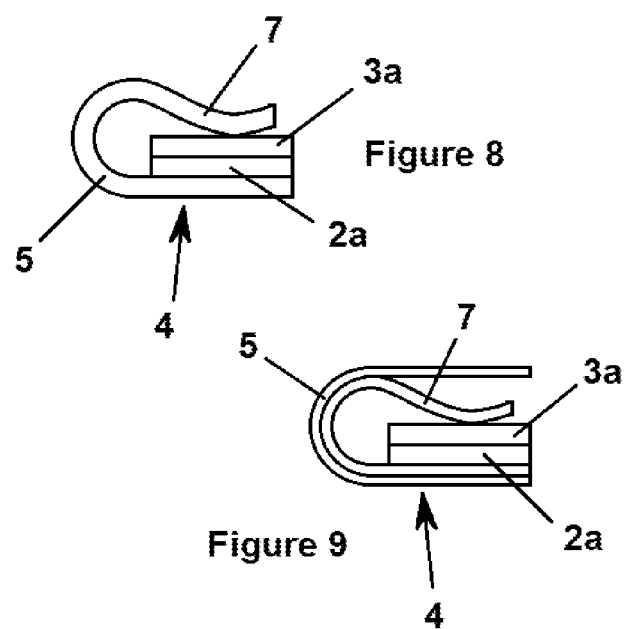
FIG. 8 relates to a schematic representation of a second embodiment of an assembled connection device according to the invention in a sectional view in a plane perpendicular to the plane of the sliding contact.

According to a specificity of this construction feature, the junction piece 5 incorporates a pressurizing means 7 which presses against the surface of at least one connection tab to hold the connection tabs 2a, 3a pressed together. This pressurizing means 7 may be produced by a spring means or by a pressure screw mounted on one of the legs of the junction piece and that delivers contact pressure against the juxtaposed connection tabs 2a, 3a to be gripped against the inner surface 4b of the junction piece 5 positioned level to the leg carrying the contact surface 4a of the junction piece 5. According to the type of embodiment of this characteristic, the pressurizing means 7 is formed by an independent element that may be mounted to the junction piece 5 or, alternatively, the pressurizing means 7 is formed by the junction piece 5 itself, for example when the pressurizing means is a spring as shown in FIG. 8. According to a construction example, when this pressurizing means 7 is a spring means, this pressurizing means 7 is constructed so as to at least press the connection tabs 2a, 3a against each other. This pressurization is exerted by at least a portion of the spring means 7 which pushes against one of the surfaces of at least one of the connection tabs. The second connection tab is then held locked by a second portion of the spring means 7 or by a part of the junction piece 5. In particular, this lock of the second connection tab can be easily obtained when the junction piece 5 is made in the shape of a jumper structure.

According to a specific construction of the pressurizing means 7, it is made of at least one electrically conductive material so as to ensure electrical continuity between at least one of the connection tabs and the contact surface 4a of the junction piece 5.

Figure 9:
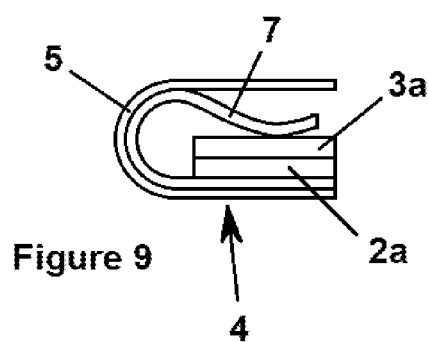
FIG. 9 relates to a schematic representation of a second embodiment of an assembled connection device according to the invention in a sectional view in a plane perpendicular to the plane of the sliding contact.

According to a specific arrangement of the pressurizing means 7, the junction piece 5 comprising at least one jumper structure, the pressurizing spring means 7 is positioned between the legs of the jumper. Thus, the spring means 7 bears against at least one leg of the junction piece 5 to exert pressure against at least one of the connection tabs 2a, 3a positioned between the legs of the jumper structure. An example of a construction of this specificity is illustrated in FIG. 9.

According to a specific alternative construction, the spring-type pressurizing means 7 is mounted on the structure of the junction piece 5 so as to comprise at least a first portion positioned outside the junction piece 5 and a second portion placed through a portion of the junction piece 5 at a dedicated orifice 8. An embodiment of such an arrangement of the spring means 7 with the junction piece 5 may consist of that illustrated in FIG. 1.

According to a specificity complementary to the spring-type pressurizing means 7, whatever the arrangement of the spring means 7 with respect to the junction piece 5, the latter comprises a fixed first end with the structure of the junction piece 5 and a second end adapted to bear against a connection tab. According to the arrangement, the connection tab against which the spring means 7 exerts pressure may correspond to each of the connection tabs 2a, 3a of the device.

According to a construction feature, the structure of the junction piece 5 is formed of a single electrically conductive material. This construction thus makes it possible to optimize the electrical continuity between, firstly, the connection tabs 2a, 3a and, secondly, the contact surface 4a of the junction piece 5 placed level with the sliding contact surface 4 of the conductors.

Alternatively, the structure of the junction piece 5 is formed of at least two materials:
a first electrically conductive material place level with a portion forming the contact surface 4a of the junction piece 5 and an electrical contact portion with a connection tab 2a, 3a, a second material with different electrical properties from that of the first material, which realizes all or part of the jumper structure for gripping the connection tabs 2a, 3a.

Of course, the invention is not limited to the embodiment described and shown in the attached drawings. Modifications remain possible, in particular from the point of view of the make up of the various items or by substituting technical equivalents, without completely departing from the field of invention protection.

The invention claimed is:

1. A connection set for connecting two conductive elements of a conductor rail including a sliding contact surface, the connection set comprising:
   two connection tabs formed by one end of each of the two conductive elements, the two connection tabs being arranged to be placed in respective parallel planes and offset with respect to the sliding contact surface of the conductor rail; and
   a junction piece of the two connection tabs comprising at least one contact surface placed level with the sliding contact surface of the conductor rail, arranged according to a jumper structure with its legs positioned on either side of the two connection tabs in contact so as to grip the two connection tabs of the conductive elements, while making an electrical connection between at least one connection tab of a conductive element and the contact surface of the junction piece placed level with the sliding contact surface of the conductor rail.

2. The connection set in accordance with claim 1, wherein:
   the offset of a first connection tab with respect to the sliding contact surface of the conductor rail forms a gap similar to a thickness of a portion of the junction piece which carries the sliding contact surface, and
   the offset of a second connection tab with respect to the sliding contact surface of the conductor rail forms a gap similar to a cumulative thicknesses of a portion of the junction piece carrying the contact surface and the first connection tab.

3. The connection set in accordance with claim 1, wherein the two connection tabs of the conductive elements comprise shapes that are complementary to each other.

4. The connection set in accordance with claim 1, wherein the two connection tabs of the conductive elements comprise at least one locking interface of a translation between the two connection tabs of the conductive elements made by a combination of reliefs and/or forms performing a type of male/female interaction.

5. The connection set in accordance with claim 1, wherein the junction piece incorporates a spring-type pressurizing means which presses against the contact surface of at least one connection tab to hold the two connection tabs pressed together.

6. The connection set in accordance with claim 5, wherein the junction piece comprises at least one jumper structure, and the spring-type pressurizing means is positioned between the legs of the jumper structure.

7. The connection set in accordance with claim 5, wherein the spring-type pressurizing means is mounted on the jumper structure of the junction piece so as to comprise at least a first portion positioned outside the junction piece and a second portion placed through a portion of the junction piece at a dedicated orifice.

8. The connection set in accordance with claim 5, wherein the spring-type pressurizing means comprises a fixed first end with the jumper structure of the junction piece and a second end adapted to bear against a connection tab.

9. The connection set in accordance with claim 1, wherein the jumper structure of the junction piece is formed of a single electrically conductive material.

10. The connection set in accordance with claim 1, wherein the jumper structure of the junction piece is formed of at least two materials:
   a first electrically conductive material placed level with a portion forming the contact surface of the junction piece and an electrical contact portion with a connection tab, and
   a second material with different electrical properties from that of the first electrically conductive material, which realizes all or part of the jumper structure for gripping the two connection tabs.

* * * * *